Dec. 24, 1968  C. ISAACSON ET AL  3,417,416
APPARATUS FOR ASSEMBLING INSOLES ON LASTS
Filed May 5, 1966  8 Sheets-Sheet 1

*Fig.1*

Inventors
Calvin Isaacson
Norman A. Ouellette
By their Attorney

Fig.7

United States Patent Office 3,417,416
Patented Dec. 24, 1968

3,417,416
APPARATUS FOR ASSEMBLING INSOLES ON LASTS
Calvin Isaacson, Beverly, Mass., and Norman A. Ouellette, Palm Beach Gardens, Fla., assignors to United Shoe Machinery Corporation, Boston, Mass., a corporation of New Jersey
Filed May 5, 1966, Ser. No. 547,911
15 Claims. (Cl. 12—1)

This invention relates to apparatus for assembling insoles on lasts and has for its principal object the provision of a novel and improved machine for automatically assembling an insole on the bottom of a last, positioning the insole relatively to the bottom of the last and for fastening the insole to the last.

With the foregoing general object in view, and in accordance with features of the invention, the herein illustrated machine has conveyor means for presenting a series of lasts, one by one, successively to an assembling station at which there are provided means for assembling an insole on the bottom of each last as it arrives at said station, means for positioning the insole relatively to the bottom of the last and means for securing the insole to the last. More particularly, and in accordance with other features of the invention the means for presenting the lasts to the assembling station comprises a conveyor carrying a plurality of spaced-apart last supports, herein illustrated as being in the form of a rotary table, together with means for indexing the table step by step thus to present lasts mounted on the supports, one by one, successively to the assembling station. The means for assembling the insoles on the lasts preferably comprises means for storing a stack of right insoles and a stack of left insoles together with a sensing means, herein illustrated as being of the photoelectric type, for determining the character of each last as it is presented to the assembling station and for selectively removing a corresponding insole from one or the other of the stacks and depositing it on the bottom of the last at said station.

Preferably, and in accordance with still other features of the invention, the means for positioning each insole on the bottom of its last includes gauge members, movable into engagement with the opposite ends of each last, as it is presented to the assembling station, these gauge members having insole engaging surfaces for positioning the insole on the bottom of the last and other insole engaging surfaces for guiding the insole as it is being assembled on the bottom of the last by movement heightwise thereof toward the last bottom. For securing each insole to the bottom of its last, means are provided for exerting pressure on the opposite ends of each insole as it is assembled on the bottom of the last and these pressure applying members may, in accordance with another feature of the invention, be adapted to drive fastenings, such for example, as tacks, through the insole and into the bottom of the last thus to secure the insole to the bottom of the last.

The above and other objects and features of the invention will appear in the following detailed description of the embodiment illustrated in the accompanying drawings, and will be pointed out in the claims.

Figure 1:
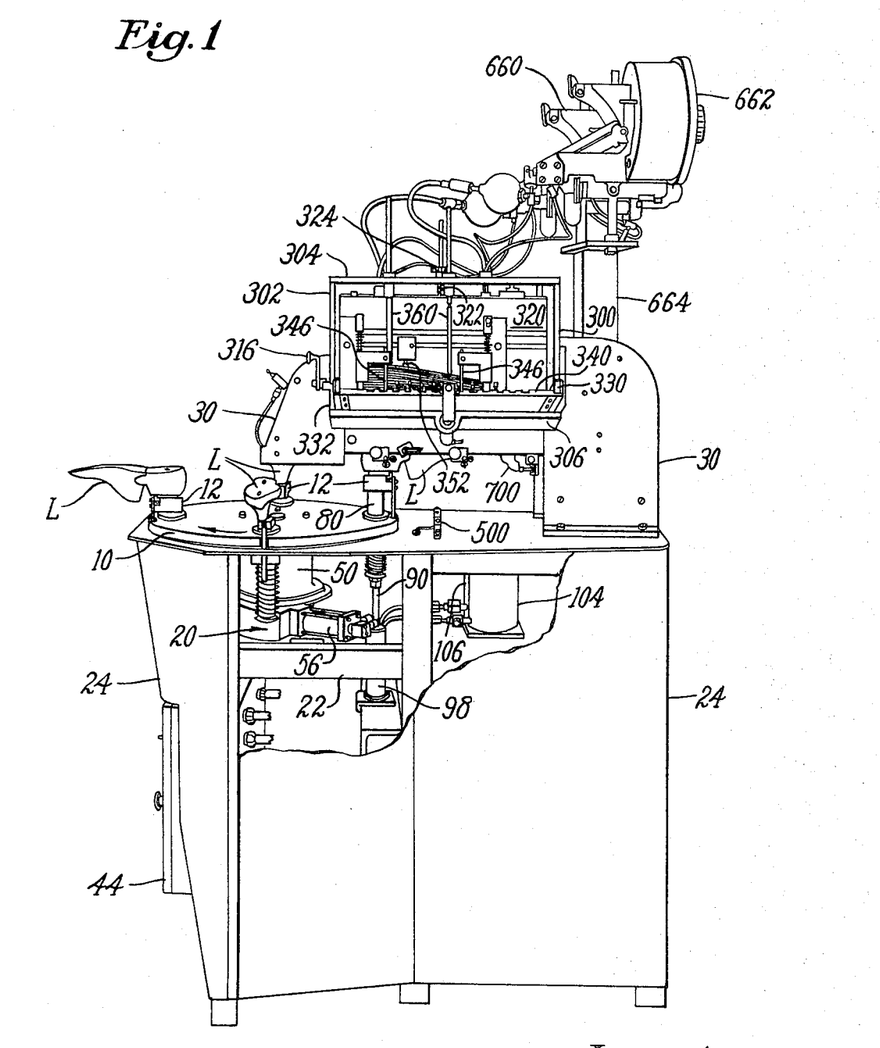
FIG. 1 is a side elevation in perspective of a machine embodying the features of this invention.
Figure 2:
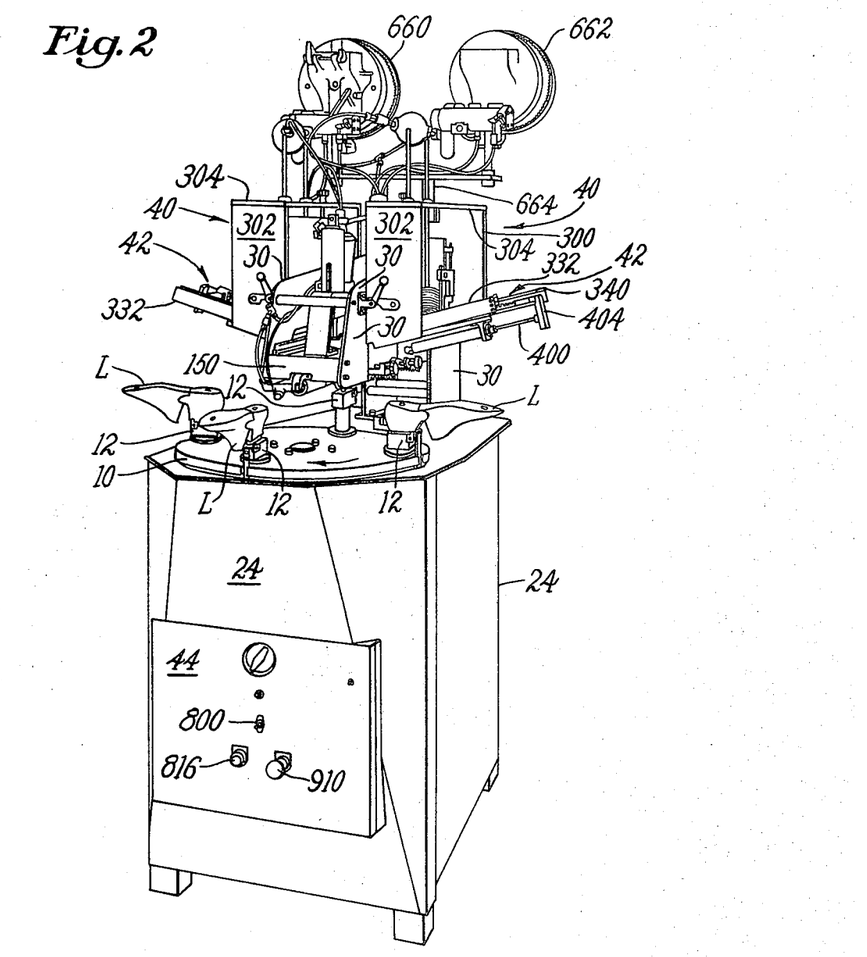
FIG. 2 is a front view, also in perspective, of the machine shown in FIG 1.

Referring to these drawings, and particularly to FIGS. 1 and 2 thereof, the machine therein illustrated comprises a conveying device in the form of a table 10 carrying four last supporting spindles 12 and mounted for angular indexing movement to present, successively, lasts L mounted on the spindles to an insole assembling, positioning and fastening station, the various operating elements of which are shown in more detail in FIGS. 3–6 of the drawings. The table 10 and an indexing mechanism indicated generally by the reference character 20, are supported on a cross-member 22, forming a part of a fabricated frame construction indicated generally by the reference character 24. The various parts associated with the insole assembling, positioning and fastening station are carried by an overhanging arm assembly including two spaced-apart side plates 30, 30 which are supported on, and in effect form a part of, the fabricated frame construction 24, FIGS. 3–5. Pivotally mounted on each of these side plates is an insole storing magazine, indicated generally by the reference character 40, and associated with each magazine is an insole feeding device, indicated generally by the reference character 42, FIGS. 2 and 6, to be described in detail below.

The frame construction 24 is enclosed by suitable front, back and side panels and the various operating members, control valve, electrical sensing devices, relays, etc. are contained within this enclosure with certain manually operable switches and other control elements conveniently disposed on a panel 44 mounted on the front of the frame construction, FIG. 2.

Figure 3:
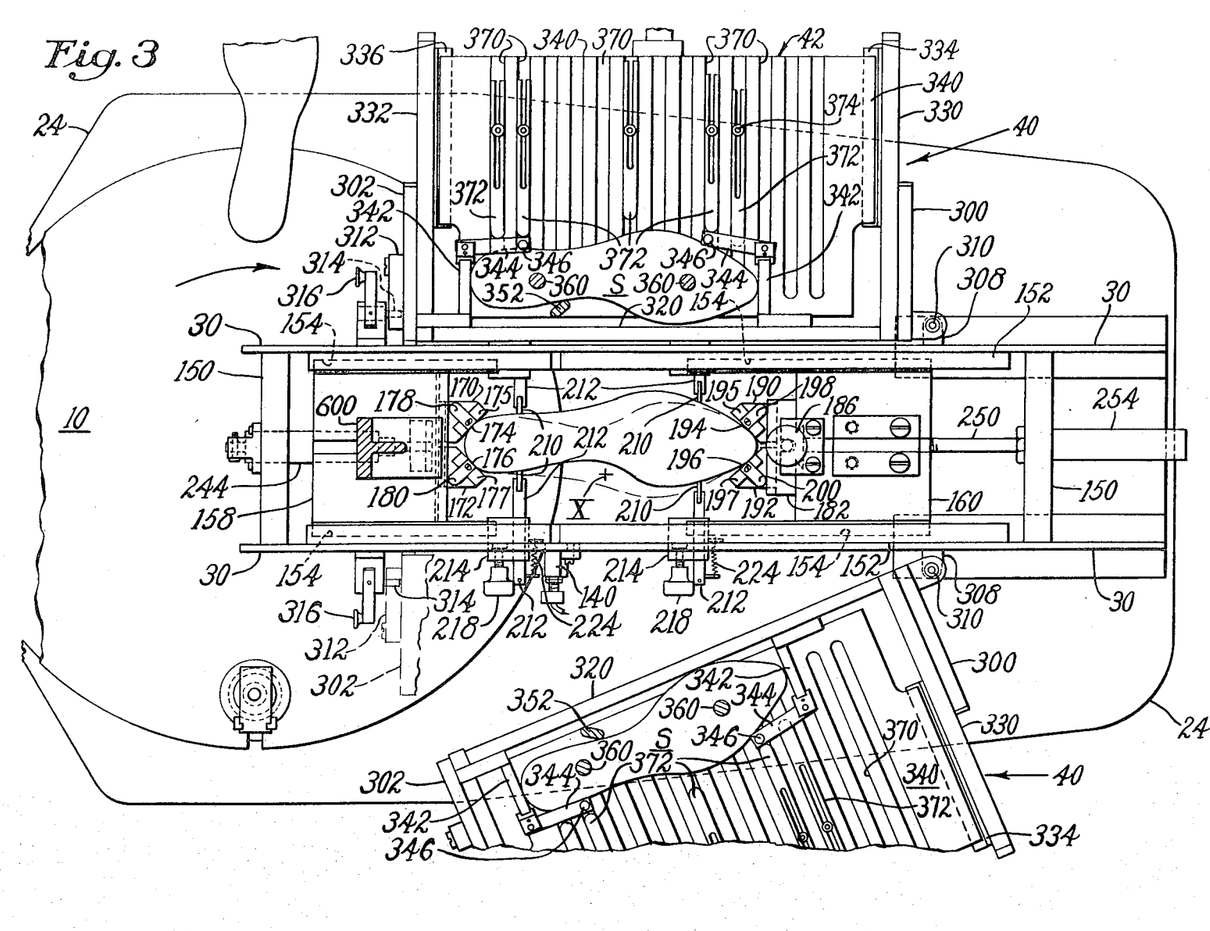
FIG. 3 is a plan view of the machine with certain operating elements omitted to simplify the disclosure and with another operating element shown in an inoperative position.
Figure 4:
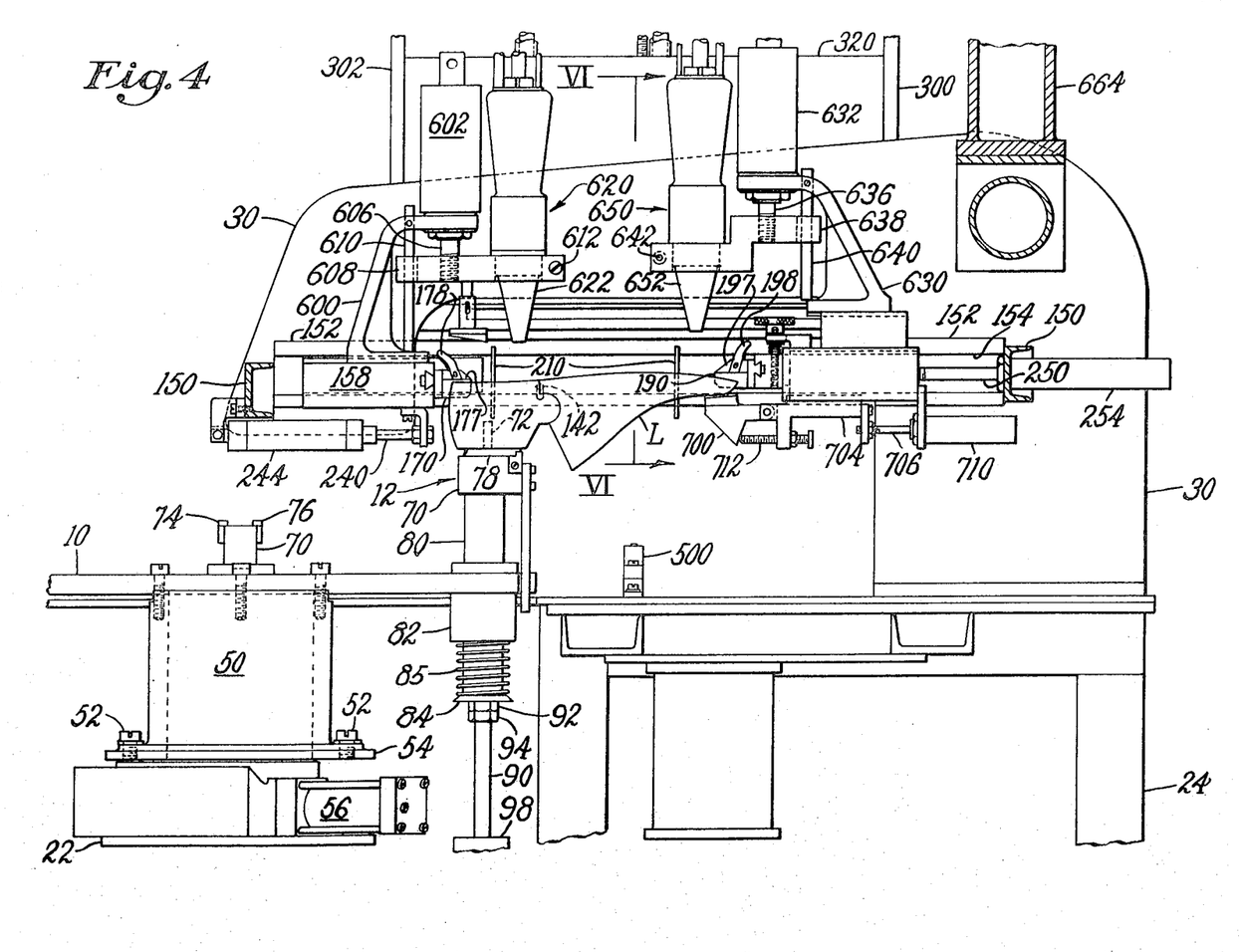
FIG. 4 is a view of the machine in side elevation with certain parts in vertical section and with other parts omitted to simplify the disclosure.
Figure 7:
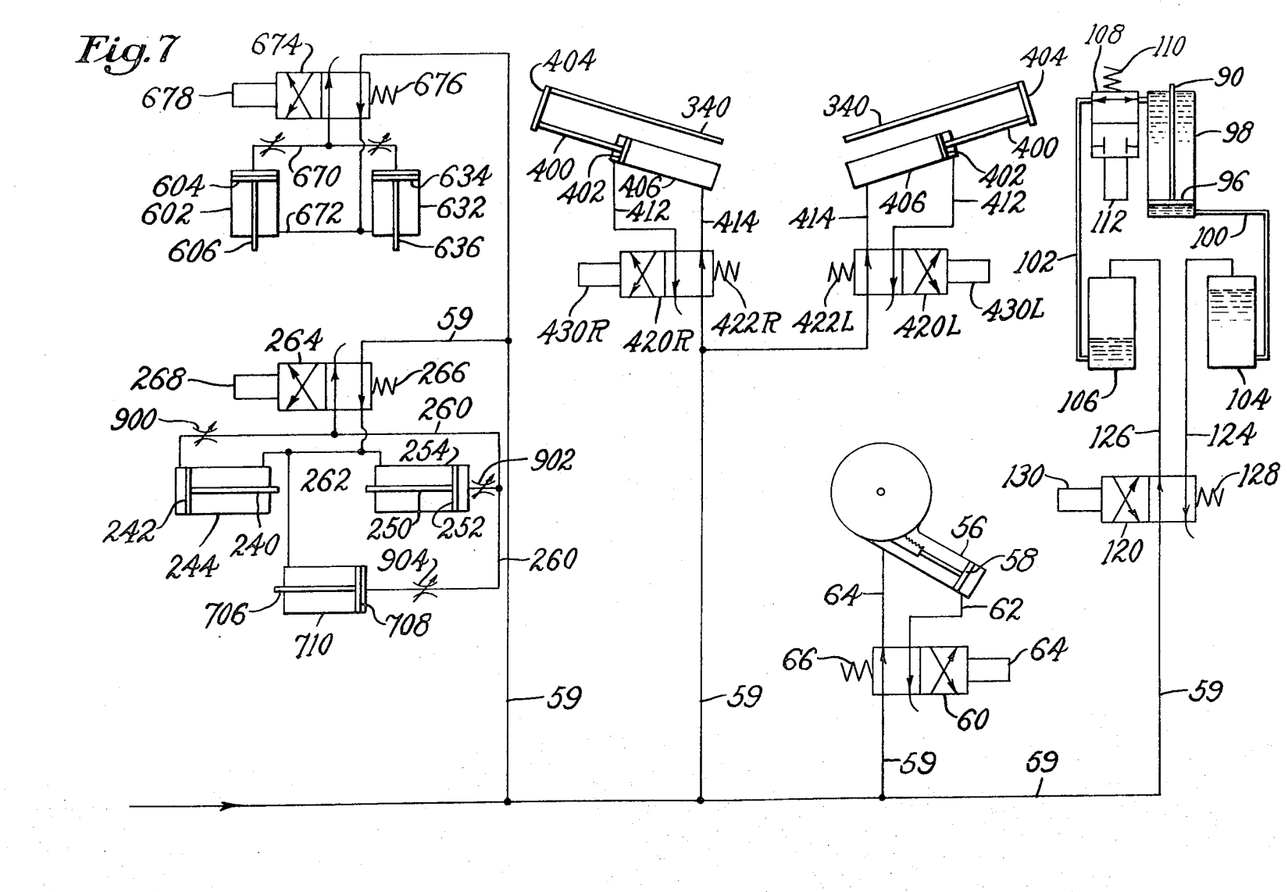
FIG. 7 is a schematic view of the fluid pressure operated motors and their associated control valves which are provided for actuating the several operating elements of the machine.

The table 10 is mounted on the upper end of a hollow cylindrical member 50 which is secured, by means of screws 52, 52, to a circular plate 54, FIG. 4, forming a part of a conventional fluid pressure operated indexing mechanism having a motor cylinder 56 within which is contained a piston 58, see FIG. 7. Inasmuch as the details of construction of this indexing mechanism form no part of the present invention, it will be sufficient here to point out that the arrangement is such that upon the admission of fluid under pressure, from a main pressure line 59, to the outer end of the cylinder 56, see FIG. 7, through a valve 60 and a conduit 62, while the other end of this cylinder is connected to exhaust through a conduit 64 and the valve 60, in response to the de-energization of a solenoid 64, associated with the valve, the table will first be unlocked, then the piston 56 will be moved from the position in which it is shown to the opposite end of its cylinder thus rotating the table through 90° (¼ of a turn), in the direction of the arrow (FIGS. 2 and 3) and finally the table will be locked in its new angular position. Upon energization of the solenoid 64 the valve 60 will be returned to its original position by a spring 66 and the piston 56 will be retracted, a one-way clutch, not shown, permitting such return movement of the piston without effecting a reverse rotation of the table 10.

Each of the last supporting jacks 12 comprises a block 70 on the upper end of which is mounted a last pin 72 adapted to enter the last pin hole of a conventional last. Also provided on this block are two lugs 74, 76, (FIG. 4) adapted to engage a surface formed on a positioning plate 78 associated with the last thus to hold the last in a definite angular position, i.e., with its longitudinal center line extending substantially radially of the table 10.

Each block 70 is fixed on the upper end of a post 80 which is slidably mounted for vertical movement in a bearing guide 82, associated with the table 10. On its lower end, each of these posts is provided with a flange 84 between which and the lower end of the guide 82 a compression spring 85 is interposed, FIG. 4. Thus, the several last supporting spindles are normally held yieldingly in their lowermost positions by these springs. However, in each of the four indexed positions of the table 10 one of the four spindles and its associated post 80 will be in direct vertical alignment with a piston rod 90, carrying at its upper end an abutment nut 92 and a lock nut 94, FIG. 4.

This piston rod is formed integrally with a piston 96, FIG. 7, contained within a cylinder 98, see also FIG. 1. The opposite ends of this cylinder are connected by means of conduits 100, 102 to the lower ends of two closed reservoirs 104, 106, partially filled with a liquid, such as oil. Interposed in the conduit 102 is a valve 108 normally held opened by a spring 110 and adapted to be closed when a solenoid 112, associated therewith is energized. Leading to a valve 120, associated with the main pressure line 59, from the two reservoirs 104, 106 are two conduits 124, 126. A spring 128 normally holds the valve 120 in the position shown so that liquid from the reservoir 106 is forced into the upper end of the cylinder 98, through conduit 102 and the opened valve 108, thus lowering the piston 96 and its piston rod 90 to the position shown in FIG. 7. However, when a solenoid 130, associated with the valve 120, is energized, this valve will be shifted so that liquid from the reservoir 104 will be forced into the lower end of the cylinder 98, thus moving the piston 96 upwardly, while liquid above this piston is returned to its reservoir 106. As the piston 96 is thus moved upwardly the abutment nut 92 on the upper end of the piston rod 90 will engage the lower end of the post 80 and this post and its spindle 12 will be elevated to the position shown in FIG. 4 and as determined by mechanism about to be described.

Figure 5:
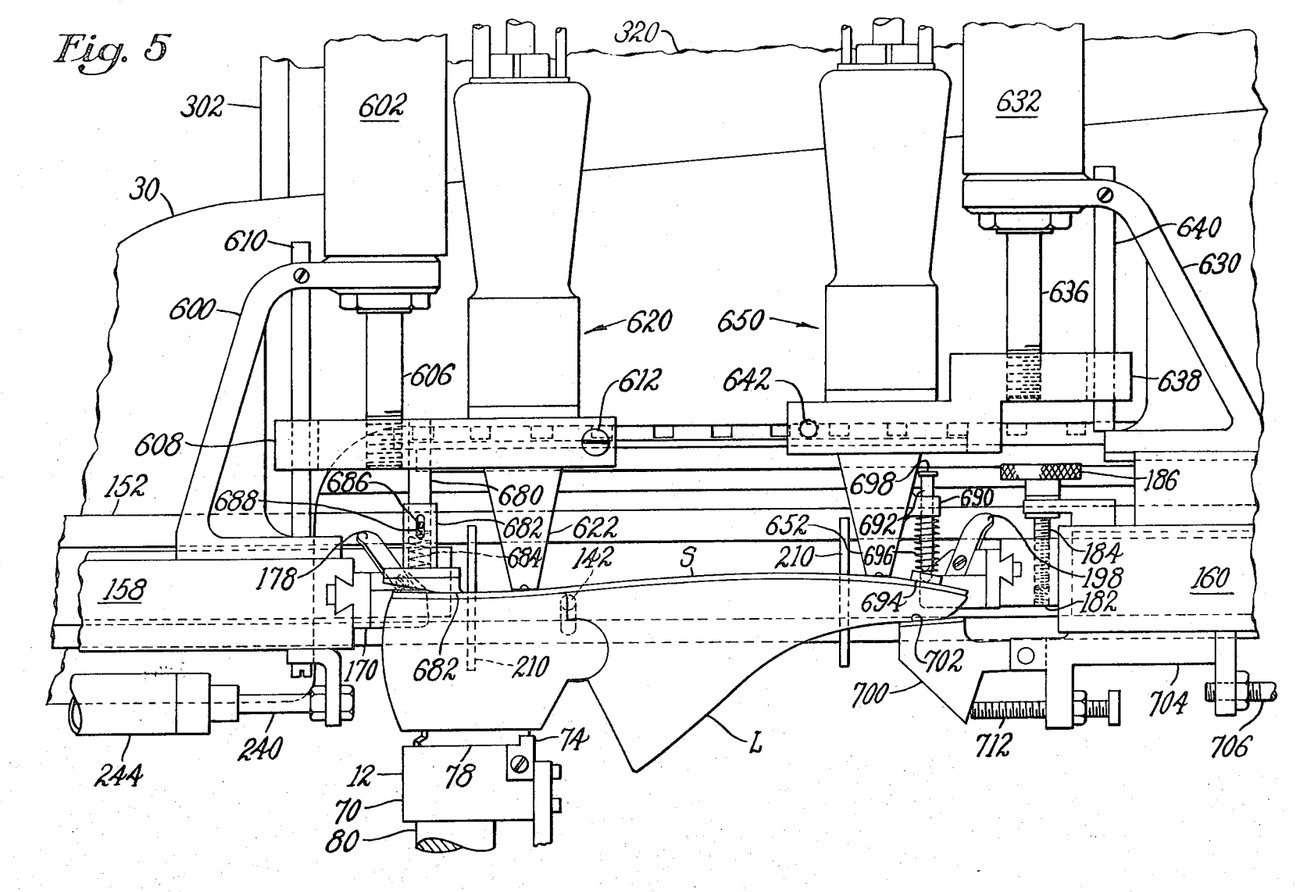
FIG. 5 is a view on an enlarged scale and in side elevation of the operating elements shown in FIG. 4.
Figure 8:
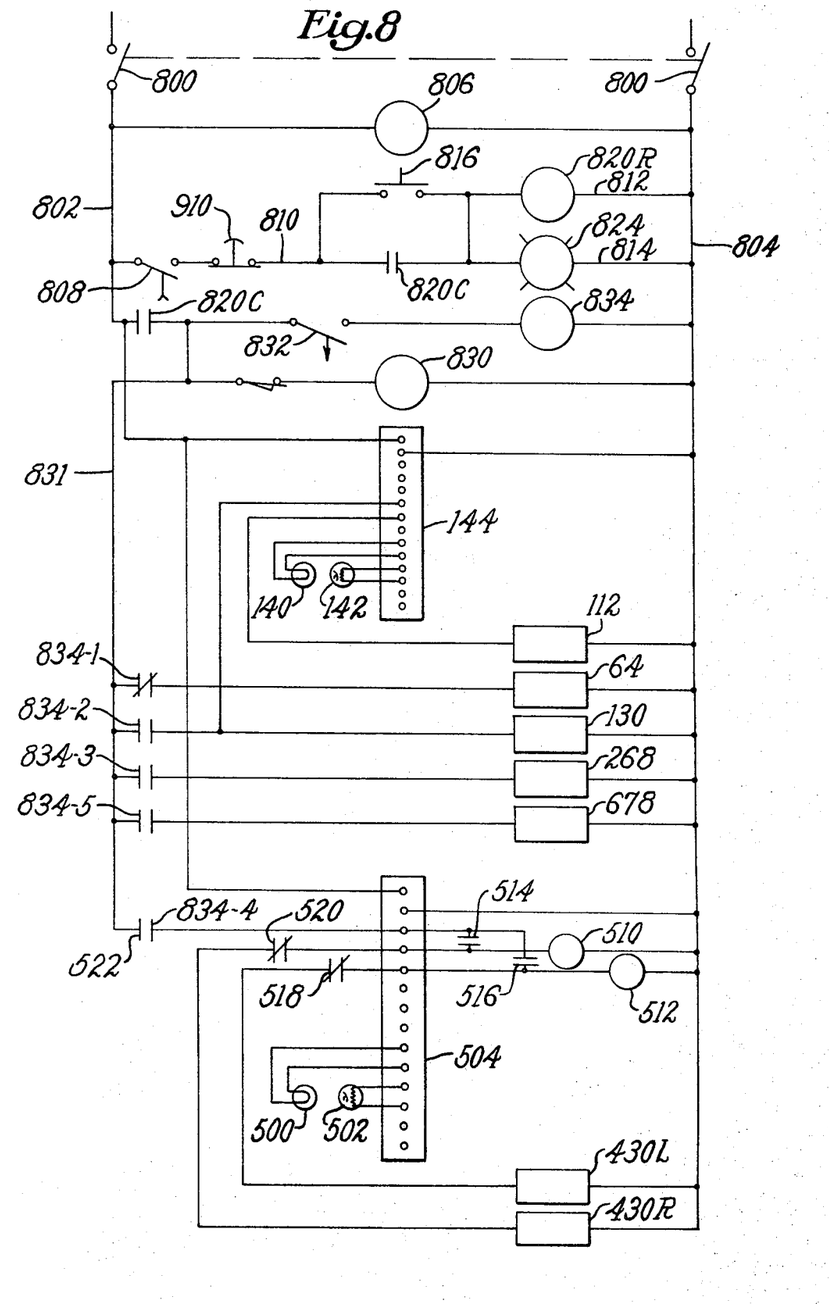
FIG. 8 is an electrical diagram.

Mounted on the side plates 30, 30 are the light source 140, FIG. 3, and the photocell 142, FIGS. 4 and 5, of a conventional photoelectric scanner system including a photorelay 144, FIG. 8, which is adapted to control the energization and de-energization of the solenoid 112 associated with the valve 108. The arrangement is such that when the light beam extending between the light source 140 and the photocell 142 is interrupted by the bottom surface of the last L, when the last approaches the desired heightwise position, the solenoid 112 will be energized, thus shifting the valve 108 to its closed position and arresting the upward movement of the piston 96 just as the last reaches the desired heightwise position. The spindle 12 and the last L thereon will now be firmly held in this position by pressure of the liquid being forced through conduit 100 and into the cylinder 98, beneath the piston 96, and the liquid trapped in the cylinder 98 above the piston by the closed valve 108.

Extending between the plates 30, 30, are two channel-like spacing members 150, 150, FIGS. 3 and 4, and secured to these plates, in oppositely facing relation, are two elongated track members 152, 152. Adjacent to their ends these track members are grooved as indicated at 154, 154 to receive linear antifriction devices 156, 156, FIG. 6, associated with two carriages 158, 160, FIGS. 3 and 4. Adjustably mounted on the inner end of the carriage 158 are two insole receiving and aligning members 170, 172, having angularly related last and insole engaging surfaces 174, 176, inclined guiding surfaces 175, 177, and upwardly and outwardly flairing guide members 178, 180, see FIG. 3. Similarly, there are adjustably mounted on a block 182, mounted on the inner end of the carriage 160 for vertical adjustment by means of an adjusting screw 184 having a knob 186, two other insole receiving and aligning members 190, 192 having angularly related last and insole engaging surfaces 194, 196, inclined guide surfaces 195, 197 and auxiliary guide members 198, 200. When the carriages 158, 160 are moved to the operating positions in which they are shown in FIG. 3, in a manner about to be described and after a last L on one of the spindles 12 has been elevated to the position shown in FIG. 4, the surfaces 174, 176 and 194, 196 will engage the toe and heel portions of the last in the manner shown in FIG. 3. Now, the inclined guide surfaces 175, 177 and 195, 197, together with the auxiliary guide members 178, 180 and 198, 200, in effect form a chute or funnel for directing a sole member S, projected into the space above the last, see FIG. 6, and permitted to fall freely downward, into accurate alignment with the bottom of the last.

Figure 6:
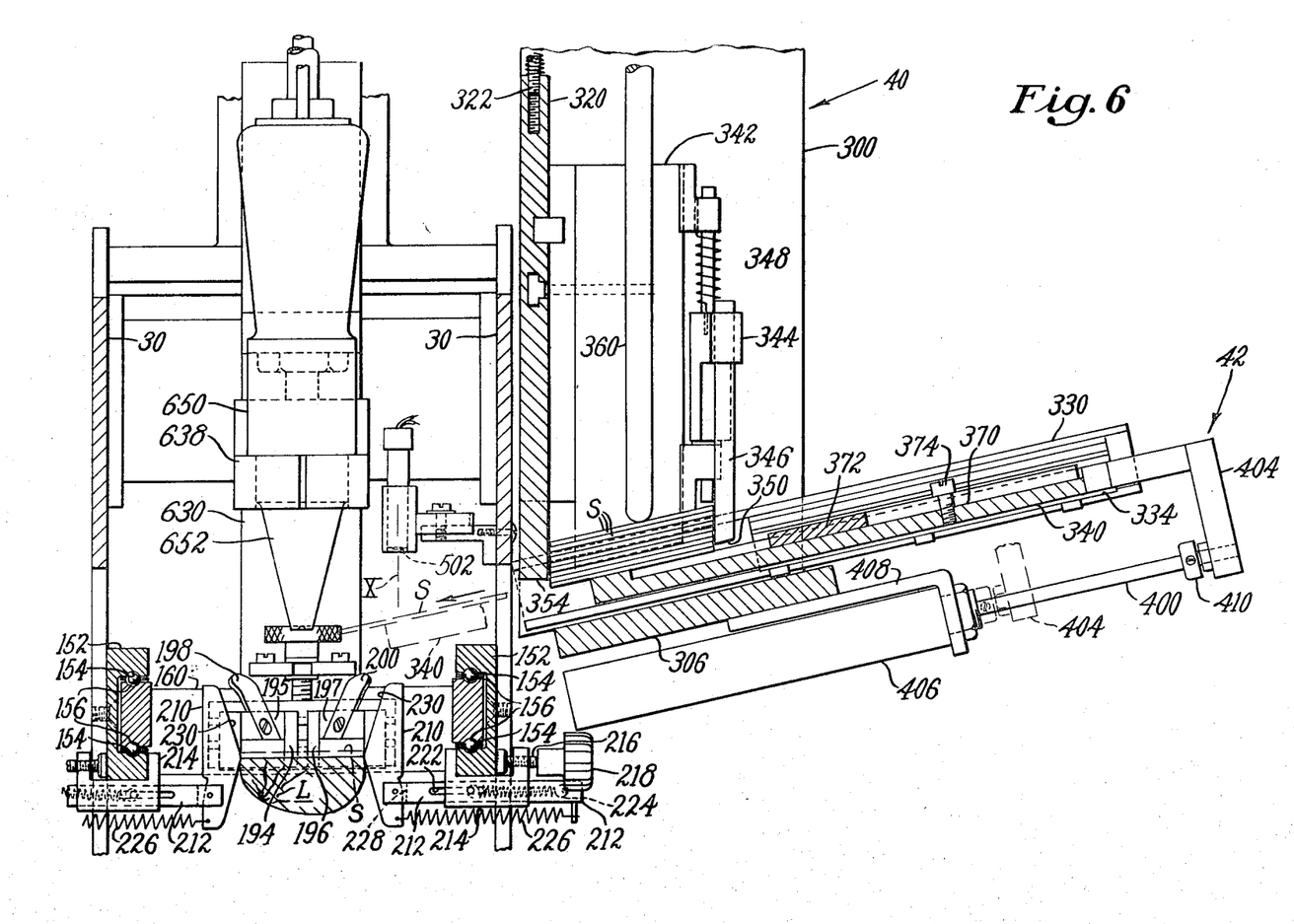
FIG. 6 is a view on an enlarged scale and in vertical section substantially on line VI—VI of FIG. 4.

In order to steer the sole member S into the range of action of the guiding surfaces on the members 170, 172 and 190, 192, four auxiliary guide members 210 are provided and disposed as shown in FIG. 3 of the drawings. Each of these four guide members is of the same construction and comprises a guide member 210 which is shaped as shown in FIG. 6 and which is pivotally mounted on the inner end of a plunger 212. This plunger is slidably mounted in a U-shaped bracket member 214, adapted to be clamped against a track member 152 by means of a clamping screw 216 having a knob 218, and is urged yieldingly inwardly, to the extent permitted by a pin 220 and slot 222, by means of a coil spring 224, see also FIG. 3. A coil spring 226 connected to the lower end of the guide member 210 tends to swing it yieldingly toward the last L, while an abutment surface 228 on the plunger limits such swinging movement of the member 210 when there is no last between these auxiliary guide members. The outwardly inclined guide surfaces 230 (FIG. 6) on these four auxiliary guide members will engage the falling sole member and steer it into the range of action of the several guide surfaces on the members 170, 172 and 190, 192, referred to above, in a manner which will be quite apparent.

Connected to the carriage 158 is the rod 240 of a piston 242 (FIG. 7) contained within a cylinder 244. FIGS. 4 and 5, and connected to the carriage 160 is the rod 250 of a piston 252 contained within a cylinder 254. Conduits 260, 262, associated with the opposite ends of these cylinders (see FIG. 7) are adapted to be connected to a branch of the main pressure line 59 or to exhaust, by means of a valve 264. A spring 266 is arranged to hold this valve in a position to connect the outer ends of these cylinders to exhaust while the inner ends are connected to the pressure line when a solenoid 268, associated with the valve 264 is de-energized. The pistons 242 and 252 will then be moved to the outer ends of their respective cylinders and the carriages 158, 160 will be retracted to their inoperating positions. On the other end upon energization of the solenoid 268, these carriages will be moved inwardly to an extent determined by the engagement of the last engaging surfaces 174, 176 and 194, 196 on the guide members 170, 172 and 190, 192, with the toe and heel portions of the last L as shown in FIGS. 3 and 4.

For delivering insoles to the space above a last L, after the last has been elevated to the position shown in FIGS. 4, 5 and 6, the two insole storing magazines 40, 40 and insole feeding devices 42, 42 are provided, one magazine and one feeding device being located on one side of the machine and adapted for storing and feeding right insoles and the other magazine and feeding device being located on the opposite side of the machine and adapted for storing and feeding left insoles. The magazines and feeding devices are, however, of exactly the same mechanical construction, but arranged more or less as mirror images, one or the other. As shown in FIG. 3, the magazine on the right hand side of the machine receives left insoles while the magazine on the left side of the machine receives right insoles.

Each magazine comprises a box-like structure having two end walls 300, 302, a top wall 304 and a bottom wall 306, this structure being hinged to one of the side plates 30 by means of a bearing bracket 308 and a hinge pin 310, FIG. 3. Carried by the end wall 302 of each magazine is a hook-like catch 312 which is adapted to be engaged by an eccentric locking pin 314 having an operating handle 316 by means of which the pin may be rotated, after engagement with the catch 312, thus to hold the magazine firmly in the operating position as shown in the upper part of FIG. 3. By rotating this pin in the opposite direction, pressure against the catch 312 will be relieved and the catch may then be released to permit swinging of the magazine away from the side plate 30, as shown in the lower portion of FIG. 3, to facilitate loading of insoles or for any other purpose.

On the side adjacent to the side plate 30 each magazine has a front wall 320 which is mounted on the end walls 300, 302 for vertical sliding movement by means of an adjusting screw 322 FIG. 6, which is journaled in the top wall 304 and provided with a hand knob 324, FIG. 1. Secured to the end walls 300, 302 and extending outwardly therefrom are supporting members 330, 332 carrying channel-like guides 334, 336 for an insole supporting and feeding plate 340. Mounted on the inside face of the front wall 320 of each magazine for adjusting movements in directions extending horizontally and lengthwise of a last in the position shown in FIG. 3, are two right angled bracket members 342, 342 and pivotally mounted on each of these bracket members is an arm 344 carrying an insole engaging finger 346, FIG. 6. A coil spring 348 is arranged to swing each arm 344 in a direction to hold its finger 346 yieldingly against the marginal edges of a stack of insoles, as shown. At its lower end, each of the fingers 346 is provided with a surface 350 which is parallel to the upper surface of the plate 340 and spaced therefrom by a distance slightly less than the thickness of the insoles being handled.

The brackets 342, 342 are so adjusted for the particular size of insole to be accommodated that the toe ends of the insoles of a stack of insoles would contact one bracket 342 while the heel ends of these insoles would contact the other bracket 344, as shown in FIG. 3. One of the fingers 346 will then yieldingly engage the marginal edges of the foreparts of the insoles on one side and thus hold the marginal edges of the insoles on the opposite sides yieldingly against the inside surface of the front wall 320. At the same time, the other finger 346 will yieldingly contact the marginal edges of the insoles on one side of the heel ends thereof and thus yieldingly urge the opposite sides of the heel ends of the insoles against a stop finger 352, mounted on the front wall 320 of the magazine. The lower end of this stop finger is parallel to and lies in the same heightwise plane as the lower edge 354 of the front wall 320 which is so adjusted heightwise, with relation to the upper surface of the plate 340, that the lowermost insole of the stack can just pass beneath the lower edge 354 of the front wall and also, of course, beneath the lower end of the stop finger 352.

As shown in FIG. 6, the lowermost insole of the stack of insoles rests directly on the upper surface of the feeding plate 340. Bearing on the uppermost insole of the stack are the lower ends of two rods 360, 360, These rods are freely slidable vertically in suitable bearing guides associated with the top wall 304 of the magazine and are of such a weight as to hold the stack of insoles down on the plate 340 with a force sufficient to prevent the lowermost insole from sliding out of place.

The upper surface of each insole supporting and feeding plate 340 is provided with a plurality of parallel spaced-apart grooves 370, 370 and in certain selected grooves round ended insole pusher members 372, 372 are disposed, these members being held in adjusted position on the plate, so that the rounded ends are substantially equidistant from the marginal edge of the lowermost insole, as shown in FIG. 3, by means of clamp screws 374, 374 which pass through slots in these members. Thus, when the plate 340, associated with the magazine on the right hand side of the machine is moved from the retracted position shown in solid lines in FIG. 6, to the broken line position indicated in this figure, the magazine at this time, of course, being in the operative position shown in FIG. 6 and corresponding to the position of the magazine shown in the upper portion of FIG. 3, the plate 340 will first slide along on the bottom surface of the lowermost insole of the stack of insoles, inasmuch as the friction between the upper face of this insole and the lower face of the insole above it is considerably greater than the friction between the plate 340 and the lowermost insole, until the rounded ends of the several pusher members 372 engage the insole. Now, the lowermost insole will be slipped from beneath the stack and carried along with the plate 340 until movement of the plate is arrested when it reaches the position indicated in broken lines in FIG. 6. The insole, however, will, due to momentum, keep on moving in the same direction and, in effect, will be projected into the space directly above the last L.

Next, this insole will fall under the influence of gravity toward the last, being guided in its descent first by the auxiliary guide members 210, 210, 178, 180, 198, 200, next by the inclined guide surfaces 175, 177, 195, 197, and lastly by the vertical guide surfaces 174, 176, 194, 196 on the last and insole aligning members 170, 172, 190, 192, finally coming to rest upon the bottom of the last as shown in FIG. 6. As will be apparent in FIG. 3, when the insole comes to rest upon the bottom of the last it will be quite accurately aligned therewith by the action of the angularly disposed vertical guide surfaces 174, 176, on members 170, 172, which engage the heel ends of the last and insole and 194, 196 on members 190, 192 which engage the toe ends of the last and insole. When the plate 340 is returned to its original retracted position, the stack of insoles will drop down until the now lowermost insole comes to rest on the upper surface of the plate 340, see FIG. 6.

For effecting such a reciprocating movement of each of the insole supporting and feeding plates 340, the rod 400 of a piston 402, FIG. 7 is connected thereto by means of an angular member 404, FIG. 6. Each piston 402 is disposed within a cylinder 406, mounted on the bottom wall 306 of its associated magazine by means of a bracket 408. For limiting the extent of feeding movement of each plate 340 a stop collar 410 is adjustably mounted on each piston rod 400.

As shown in FIG. 7 there are two pistons 402 and cylinders 404, one for each of the insole feeding devices. For controlling the admission of pressure fluid to an exhaust from the opposite ends of these cylinders, through conduits 412, 414, two similar control valves are provided. For convenience, the valve which appears on the left in FIG. 7 and which is associated with the magazine on the left hand side of the machine, but which is adapted to receive and store right insoles, will be designated 420R while the other valve will be designated 420L. As shown in FIG. 7, springs 422R and 422L normally hold the above mentioned valves in positions to connect the inner ends of their associated cylinders to the main pressure line 59 while the opposite ends are connected to exhaust. Under these conditions, each of the insole supporting and feeding plates 340 will occupy the retracted positions in which one of them is shown in FIG. 6. Also associated with these valves are solenoids 430R and 430L and when either one of these solenoids is energized its valve will be shifted to a position to cause the associated plate 340 to move to a position corresponding to that shown in broken lines in FIG. 6, thus to project an insole into the space above a last L.

To control the energization of the two solenoids 430R and 430L so that the former will be energized when a right last is elevated to the position shown in FIG. 5, and the latter when a left last is elevated to this position, a photoelectric scanning device including a light source 500, mounted on the frame 24, FIG. 1, a photoelectric cell 502 adjustably mounted on one of the side plates 30, FIG. 6, and a photoelectric relay, indicated generally by the reference character 504 is provided, FIG. 8. This photoelectric scanning device which is of conventional construction, and hence need not be described in detail, is adapted to project a beam of light along a vertical axis x diagrammatically illustrated in FIGS. 3 and 6. This light beam is so positioned that it will be interrupted by a left last, see broken lines in FIG. 3, but will not be interrupted by a right last, see solid lines, FIG. 3. Accordingly, the scanning device has associated with it two relay coils 510, 512 having, respectively, normally open contacts 514, 516 and normally closed contacts 518, 520, FIG. 8. The arrangement is such that when a timer operated contact, to be identified below, is closed, if the light beam X is uninterrupted, the relay coil 510 will be energized thus closing its contact 514 and opening its contact 518, and thereby energizing the solenoid 430R. Conversely, if the light beam is interrupted, as it will be by a left last, when the timer operated contact 522 is closed, the coil of relay 512 will be energized, closing its contact 516 and opening its contact 520, thereby energizing solenoid 430L.

Mounted on the carriage 158 is an upwardly extending bracket member 600 to which there is secured a cylinder 602, FIGS. 4 and 5. Contained within this cylinder, FIG. 7, is a piston 604 having a downwardly extending rod 606. Fastened on the lower end of this piston rod is a plate 608, slotted at its left hand end to embrace a guide member 610. Clamped to the other end of this plate, by means of a binding screw 612, is the body portion of an automatic tacking device, indicated generally by the reference character 620. This tacking device is exactly like that disclosed in U.S. Letters Patent No. 2,732,554 issued 1/31/56 on an application filed in the name of Clyde L. Knott. As will be understood from said patent, this tacking device has a nozzle 622 through which, when the nozzle is pressed against an object, for example, the insole S on the bottom of the last L, with a predetermined force, a tack is automatically driven. Similarly, there is mounted on the carriage 160 a bracket member 630 to which there is secured a cylinder 632, FIGS. 4 and 5, and contained within this cylinder is a piston 634, FIG. 7, having a piston rod 636 extending downwardly therefrom. Fastened to the lower end of this piston rod is a plate 638 slotted at its right hand end to embrace a guide rod 640. Clamped to the other end of this plate, by means of a binding screw 642, is the body portion 650 of another and similar tacking device having a nozzle 652.

Associated with these two automatic tack driving devices are two tack handling mechanisms, indicated generally by the reference characters 660, 662, FIGS. 1 and 2, which are supported on the upper end of a column 664 extending upwardly from the frame construction 24. Inasmuch as the details of construction of these automatic tacking devices and their associated tack handling mechanisms form no part of the present invention, no further description thereof is deemed to be necessary and reference may be made to the above-mentioned patent to Knott for such details. It will be sufficient here to note, as already suggested, that in response to pressure of the nozzles 622, 652 of these two devices against an insole S on the bottom of a last L, as shown in FIG. 5 of the drawings, a tack will be driven from each of said nozzles through the insole and into the wooden last thus to secure the insole to the last in the accurately aligned position to which it has previously been guided by the guide members 170, 172 and 190, 192 in the manner described above.

The opposite ends of the cylinders 602, 632 are connected, by means of conduits 670, 672 to a valve 674 which is normally held in the position in which it is shown in FIG. 7 by a spring 676, thus to connect the lower ends of these cylinders to the main pressure line 59 while the upper ends of these cylinders are connected to exhaust. Associated with this valve is a solenoid 678 adapted, when energized, to shift the valve to a position in which the upper ends of these cylinders are connected to the main pressure line while their lower ends are connected to exhaust. When the valve is thus shifted, the pistons 604, 634 will be moved downwardly, first to cause the nozzles 622, 652 to contact the insole and then to cause the tacks to be driven.

Carried by the plate 608 is a post 680 on which an abutment member 682 is mounted for yielding upward movement against a resistance of a spring 684. A pin 686 on the post projects through a slot 688 in the abutment thus to limit downward movement of the abutment when the plate 608 is elevated to the position in which it is shown in FIG. 4. Formed on the nozzle 622 is a boss 690 having a bore in which the stem 692 of a swiveled abutment 694 is slidably mounted for yielding upward movement of a spring 696. Downward movement of the stem 692 and abutment 694 is limited by a head 698 formed on the stem. When the plates 608, 638 are moved downwardly to effect operation of the tack driving devices, the abutments 682, 694 will engage the insole adjacent to its heel and toe ends and will press it yieldingly against the bottom of the last just before the nozzles 622, 652 come into contact therewith. Also, if for any reason the insole does not fall all of the way down onto the bottom of the last, it will be pushed down through the insole engaging and aligning members 170, 172, and 190, 192 first by these two yielding abutment members and then by the nozzles 622, 652. In this manner, accurate alignment of each insole on, and proper contact with, the bottom of a last, before the tacks are driven, are assured.

As will be apparent from FIG. 5 of the drawings, the pressure exerted on the heel end of the insole first by abutment 682 and then by this abutment and the nozzle 622, is sustained directly by the spindle block 70. The last pin, of course, tends to hold the last in the horizontal position shown in FIGS. 4 and 5 of the drawings. For additionally supporting the toe end of the last against the forces applied on the toe end of the insole, first by the abutment 694 and then by this abutment and the nozzle 652, a toe rest 700 having a last engaging surface 702 is provided. This toe rest is pivotally mounted on the left hand end of a slide 704 which is mounted for sliding movement on the lower side of the carriage 160, FIG. 5. Connected to the right hand end of this slide is the rod 706 of a piston 708 (FIG. 7) which is contained within a cylinder 710. The angular position of the toe rest 700, relatively to the slide 702, may be varied by means of an adjusting screw 712. As shown in FIG. 7, the opposite ends of the cylinder 710 are connected to the conduits 260, 262, mentioned above. This slide, which normally occupies a retracted and inoperative position when the carriages 158 and 160 are retracted, is thus projected to the operative position shown, with its face 702 in engagement with the toe end of the last L, when the insole receiving and aligning members 170, 172 and 190, 192 are moved inwardly and brought into engagement with the toe and heel ends of the last, after the last has been elevated to the position shown in FIGS. 4 and 5.

Referring to FIG. 8 of the drawings, a two-pole main switch 800 is arranged to connect two lines 802, 804 to a source of electrical energy, not shown. Connected between the lines 802, 804 is a first electrical timer 806 adapted to close a switch 808 in another cross line 810 having two branches 812, 814. A push button starting switch 816 is then adapted to energize the coil of a relay 820R having two normally open contacts 820C, 820C and also a pilot light 824. The closing of one of these relay contacts energizes a second electrical timer 830 adapted to close a switch 832 thereby to energize an electrical timing mechanism, while the closing of the other provides a holding circuit to coil 820R. This timing device is of conventional construction of the type readily available in the trade, and includes a motor driven cam shaft carrying five timing cams. Associated with these cams are five microswitches 834–1, 834–2, 834–3, 834–4 and 834–5. As is usual in timing mechanisms of this type, the several timing cams are adjustable so that the time periods during which these several microswitches are opened and closed, during each complete revolution of the cam shaft, may be varied to provide for the desired sequence, and duration, of the operation of the several solenoid valves associated therewith.

In the subject apparatus, these cams are so adjusted as to provide the following timing sequence. At the end of the time delay periods provided by the two electrical timing devices 806 and 830, during which various electronic tubes associated with the photoelectric relays 144 and 504 and also with the timing mechanism 834, have come up to operating temperature, the timing mechanism will be energized and its cam shaft will begin to rotate. First, the switch 834–1, normally closed to energize the solenoid 64 of the valve 60, will be opened and this valve will be shifted by means of a spring 66 to reverse the connections to cylinder 56. The table 10 will now be indexed through a 90° turn after which the switch 834–1 will be again closed to return the indexing mechanism to the position shown, the table 10 now being locked in its new position. Next, the switch 834–2 is closed thereby energizing solenoid 130 of the valve 120 which causes this valve to shift and reverse the connections to the closed reservoirs 104, 106. Piston 96 will now be moved upwardly thereby lifting the post 80 and spindle 12 which is aligned with the piston rod 90 and also with the insole assembling, positioning and fastening station of the machine. Such upward movement of the spindle 12, together with a last L which will have been previously placed on the spindle, will continue until the light beam extending from the light source 140, FIG. 3, and the photocell 142, FIGS. 4 and 5, is interrupted by the last L as it approaches the desired heightwise position. When this occurs, the photoelectric scanning system 144 energizes the solenoid 112 of the valve 108 which immediately closes and arrests the upward movement of the piston 96 together with the spindle and the last L thereon. As explained above, the last L will be firmly held in this heightwise position by the pressure of liquid being forced into the cylinder 98 beneath the piston 96 and the liquid which is trapped in the cylinder 98 above this piston by the closed valve 108. The cam of the timing mechanism which is associated with the switch 834–2 is so adjusted as to keep this switch closed until a later point in the operating cycle after the insole has been assembled, positioned and fastened to the last, in a manner about to be described.

Next, another cam on the cam shaft of the timing mechanism will close the switch 834–3 thereby energizing the solenoid 268 of the valve 264 and causing this valve to shift to a position in which main pressure fluid from the main pressure line 59 is admitted to the outer ends of the cylinders 244, 254, and also to the outer end of the cylinder 710. The two carriages 158, 160 will now be moved to the positions shown in FIG. 3 and the last and insole engaging surfaces 174, 176 of members 170, 172 and 194, 196 of the members 190, 192 will be brought into contact with the heel and toe ends of the last L, see FIGS. 3, 4 and 5. This cam of the timing mechanism is so adjusted as to keep the switch 834–3 closed until an insole has been assembled, positioned and fastened to the last. As shown diagrammatically in FIG. 7 of the drawings, suitable fluid control valves 900, 902 and 904 are provided in the several branches of the line 260 to regulate the speed of movement of the carriages 158 and 160 and also to delay movement of the piston 704 until the carriage 160 has completed its inward movement. Accordingly, the toe rest 700 will be moved to its operative position, FIGS. 4 and 5, after the members 190, 192 have been brought into engagement with the toe end of the last.

Another cam associated with the electrical timing mechanism now closes the switch 834–4 thus sending an electrical signal to the photoelectric scanning device 504. As explained above, one or the other of the two solenoids 430L or 430R will now be energized, depending on whether the last L is a right or a left last as sensed by the interruption or non-interruption of the beam of light extending, along axis $x$ between the light source 500, FIG. 1 and photocell 502, FIG. 6. Assuming, for example, that the last is a left last, the light beam will be interrupted and solenoid 430L will be energized. The valve 420L will now be shifted to reverse the connections of lines 412, 414 to cause the piston 402 in the cylinder 406, associated with the lowermost magazine, FIG. 3, which at this time will, of course, be in operating position corresponding to that of the other magazine shown in the upper part of FIG. 3, to be moved inwardly to carry with it the insole feeding plate 340. As a result of such inward movement of this plate, in the manner explained above, the lowermost insole S of the stack of insoles in the magazine, will be projected into that space above the last L and caused to fall by gravity onto the bottom of the last, the insole being guided in its descent first by the auxiliary guide members 210, 210 178, 180 and 198, 200; next by the inclined guide surfaces 175, 177, 195, 197, which act more or less like funnels, or chutes, and finally by the vertical guide surfaces 174, 176, 194, 196 on the last and insole aligning members 170, 172, 190, 192. The cam associated with switch 834–4 is so adjusted as to cause this switch to remain closed only for a short time and just long enough for the piston to complete its inward stroke. As this switch is opened the piston will be returned to its original position as shown in FIG. 7.

Finally, the appropriate cam of the timing mechanism associated with the switch 834–5 will effect closing of this switch thereby energizing the solenoid 678 of the valve 674 and causing this valve to shift to a position to admit pressure fluid to the upper ends of the two cylinders 602, 632. Pistons 604, 634 will now be moved downwardly, first to cause the holddowns 682, 694 and nozzles 632, 652 of the two tacking devices 620, 650 to engage the insole S, which has just been assembled and positioned on the bottom of the last L, to press the insole against the last and then to effect operation of these two tack devices to drive tacks through the insole and into the last thus to fasten the insole to the last. Also, as these two tacking devices descend, if the insole S has not fallen entirely through these guide members to lie flatly on the bottom of the last, the holddowns and the nozzles of the tack driving devices will push the insole down against the last before the tack driving devices are operated to drive the tacks.

As the cam shaft of the timing mechanism completes a full revolution, switch 834–5 is first opened to cause the tacking devices to be elevated to their uppermost positions, switch 834–4 having been opened almost immediately after it was closed as indicated above. Next, the switch 834–3 will be opened to de-energize the solenoid 268 and to cause the carriages 158, 160 to be moved outwardly and away from the last L. Finally, switch 834–2 will be opened to de-energize the solenoids 130, 112 thus causing the piston 96 to be moved downwardly to permit the spring 85 to return the spindle 12, together with the last L thereon to their lowermost positions.

This completes an operating cycle which is repeated continuously until a stop switch 910, FIGS. 1 and 8, is operated to break the circuit in line 810. While the various insole assembling, positioning and fastening operations were being performed at the insole assembling, positioning and fastening station, as explained above, the operator will have removed the last L with the insole assembled, positioned and fastened thereto from the spindle 12 and then will have placed another last thereon. Thus the operator merely continues to take lasts with insoles assembled thereon off of the spindles 12, on the right hand side of the machine and to place lasts thereon, as the operating cycle is repeated over and over again and until stop switch 910 is operated.

Having thus described our invention, what we claim as new and desire to secure by Letters Patent of the United States is:

1. A machine for assembling insoles on the bottoms of lasts comprising an assembling station, means for presenting a series of lasts, one by one, successively, to said assembling station, said presenting means having means for supporting a plurality of lasts, and means at said station for assembling an insole on the bottom of each last as it arrives at said station.

2. A machine in accordance with claim 1 wherein said assembling station also is provided with means for positioning said insole relatively to the bottom of said last.

3. A machine in accordance with claim 1 wherein said assembling station also is provided with means for fastening the insole to the last.

4. A machine in accordance with claim 1 wherein said means for presenting a series of lasts, one by one, successively to the assembling station comprises a conveyor mounted for step by step movement and carrying a plurality of spaced apart last supports and means for effecting step by step movement of said conveyor to present lasts mounted on said supports one by one successively to the assembling station.

5. A machine in accordance with claim 1 wherein said means for presenting a series of lasts, one by one, successively to the assembling station comprises a table mounted for rotation and carrying a plurality of angularly spaced last supports and means for indexing said table, step by step, to present lasts mounted on said supports successively to the assembling station.

6. A machine in accordance with claim 1 wherein said assembling means comprises means for storing a stack of insoles and means for depositing an insole from said stack on the bottom of the last at said station.

7. A machine in accordance with claim 1 wherein said assembling means comprises means for storing a stack of right insoles and a stack of left insoles and means for selectively removing an insole from one of said stacks and depositing it on the bottom of a last at said station.

8. A machine in accordance with claim 7 wherein said selective removing means includes sensing means for determining the right or left character of the last at said station and means for selectively removing a corresponding insole from one or the other of said stacks and depositing it on the bottom of the last at said station.

9. A machine in accordance witth claim 8 wherein said sensing means includes photoelectric devices for determining the right or left character of the last at said station.

10. A machine in accordance with claim 2 wherein said positioning means comprises gauge members movable into engagement with the end portions of each last at said station and having insole engaging surfaces for positioning the end portions of an insole assembled on the last.

11. A machine in accordance with claim 10 wherein said gauge members also have other insole engaging surfaces for guiding an insole as it is being assembled on the bottom of a last by movement heightwise of the last toward the last bottom.

12. A machine in accordance with claim 10 wherein means are also provided for exerting pressure on the opposite end portions of each insole as it is being assembled on the bottom of a last.

13. A machine in accordance with claim 3 wherein said fastening means includes a pair of members movable heightwise of the last toward the bottom of the last and adapted to exert pressure on the opposite end portions of the insole for securing said end portion to the bottom of the last.

14. A machine in accordance with claim 13 wherein said last-named pressure exerting members are adapted to drive fastenings through end portions of the insole and into the bottom of the last.

15. A machine in accordance with claim 13 wherein said last-named pressure exerting members are also adapted to drive tacks through the opposite end portions of the insole and into the bottom of the last.

References Cited

UNITED STATES PATENTS

| | | |
|---|---|---|
| 2,151,038 | 3/1939 | Lancaster. |
| 3,024,480 | 3/1939 | Baker et al. |
| 3,147,500 | 9/1964 | Ralphs. |
| 3,107,376 | 10/1963 | Reid et al. _________ 12—1 |

PATRICK D. LAWSON, *Primary Examiner.*